United States Patent [19]

O'Brien

[11] Patent Number: 4,747,665
[45] Date of Patent: May 31, 1988

[54] METHOD FOR DISPLAYING THREE-DIMENSIONAL IMAGES USING COMPOSITE DRIVING WAVEFORMS

[75] Inventor: Thomas P. O'Brien, Painesville, Ohio
[73] Assignee: Kabushiki Kaisha Toshiba, Kanagawa, Japan
[21] Appl. No.: 36,546
[22] Filed: Apr. 9, 1987
[51] Int. Cl.⁴ .......................... G02B 27/22; G02B 5/10
[52] U.S. Cl. ..................................... 350/144; 350/130; 350/608
[58] Field of Search ....................... 350/130, 144, 608; 1/2

[56] References Cited

U.S. PATENT DOCUMENTS

| | | | |
|---|---|---|---|
| 3,493,290 | 2/1970 | Traub | 350/144 |
| 3,632,184 | 1/1972 | King | 350/144 X |
| 4,130,832 | 12/1978 | Sher | 350/144 X |
| 4,639,081 | 1/1987 | O'Brien | 350/144 |

OTHER PUBLICATIONS

"A New 3-Dimensional Display Technique" by Alan C. Traub pp. 48-67, Bedfor, Massachusetts, May 1968.
Kinsler and Frey, Fundamentals of Acoustics, Second Edition John Wiley & Sons, Inc., 1950.

Primary Examiner—John K. Corbin
Assistant Examiner—Scott J. Sugarman
Attorney, Agent, or Firm—Finnegan, Henderson, Farabow, Garrett & Dunner

[57] ABSTRACT

A flexible membrane mirror is driven by a waveform synchronized to a display of a sequence of two-dimensional images on a CRT screen so that a viewer perceives a three dimensional image. The driving waveform is characterized by low noise and a bright image. The driving waveform can be a composite of a triangle wave and a sinusoid.

2 Claims, 3 Drawing Sheets

METHOD FOR DISPLAYING THREE-DIMENSIONAL IMAGES USING COMPOSITE DRIVING WAVEFORMS

BACKGROUND OF THE INVENTION

1. Field of the Invention

This invention relates to a method for displaying three-dimensional images using a cathode ray tube (CRT) and a flexible membrane mirror driven by a waveform. More specifically, the invention relates to an improved method of displaying three-dimensional images by driving the mirror with a combined sinusoidal, triangular waveform.

2. Description of the Prior Art

A flexible membrane mirror reflects a two-dimensional image displayed on a CRT. The flexible membrane mirror is displaced so that a surface of the mirror is alternately convex and concave. This displacement or vibration of the mirror is caused by an action of a loudspeaker which is mounted directly behind the mirror. This action of the loudspeaker moves an apparent image plane of the mirror toward and away from a viewer. As the image plane moves, two-dimensional images are displayed sequentially on the CRT screen. When the motion of the mirror and the timing of the CRT images are properly synchronized, the viewer perceives a three-dimensional image. The apparent image planes should be spaced equally in distance from each other along a viewing axis of the mirror for geometric fidelity, they each should be displayed for an equal duration of time for uniform brightness, and the mirror should operate quietly, i.e., without audible noise.

The basic technology for making such a display system is known in the art, as illustrated, for example, in U.S. Pat. No. 3,493,290 issued to Traub, as well as in a 1968 article by Traub, "A New 3-Dimensional Display Technique", distributed by the Mitre Corporation.

One conventional waveform with which to drive the mirror is a triangle wave. Since the slope of a triangle wave is constant, the mirror moves toward and away from the viewer at a constant speed, and the image plane moves toward and way from the viewer at nearly a constant speed. Therefore, if two-dimensional images are displayed on the CRT with equal spacing in time, the image planes will also be approximately equally spaced in distance along the viewing axis. Because this spacing of the image planes along the viewing axis is only approximately equal in distance, there is some geometric infidelity.

This approximate equal time spacing of the two-dimensional images has a further important advantage in that there is virtually no gap or interval of time between displayed two-dimensional images. In other words, the CRT is displaying two-dimensional images virtually at all times; the time interval between displayed two-dimensional images approaches zero and there is essentially no wasted time. Moreover, two-dimensional images can each be displayed for a long amount of time, giving a bright image.

Unfortunately, the triangle wave has a very serious shortcoming because it contains high frequency harmonics. These harmonics cause the mirror to emit an unacceptable level of sound, and also excite higher harmonics of the mirror's resonant frequency, causing distortion in the mirror surface and also in the displayed image. Because of these problems of noise and distortion, actual display systems commonly use a sine wave for the driving waveform.

A pure sine wave has no harmonics whatsoever, and hence produces undistorted mirror surfaces and also produces the least mirror noise.

However, a disadvantage of a sine wave drive signal relates to geometric fidelity. A sine wave has a constantly changing slope; therefore, to keep the perceived three-dimensional image in geometric fidelity, that is, to keep the image plane locations equally spaced in distance along the viewing axis, the two-dimensional images must be unequally spaced in time. In other words, there are gaps or intervals of time when the CRT is displaying no two-dimensional image.

Another problem with a sine wave drive signal is that image brightness is reduced. To maintain uniform brightness for all the two-dimensional images, each image must be displayed for the same amount of time as every other two-dimensional image. This amount of time can only be as long as the shortest image time, which occurs when the slope of the sine wave is at its maximum. The approximate magnitude of this reduction in brightness can be found by simply finding the ratio of the maximum slope of the sine wave to the slope of the triangle wave.

Let:
Period = T
Amplitude = C
w = frequency (rad/sec = $2\pi/T$ $$\text{Brightness Ratio} = \frac{\text{maximum slope of sine wave}}{\text{slope of triangle wave}}$$

$$= \frac{\frac{d}{dt}(C \cdot \sin wt)}{4C/T} \text{ at } t = 0$$

$$= \frac{C \cdot w \cdot \cos(w \cdot 0)}{4C/T}$$

$$= \frac{2\pi/T}{4/T} = \frac{\pi}{2}$$

$$\text{Brightness Ratio} = 1.57:1$$

Thus it can be seen that although the sine wave gives quiet operation without distortion of the image, it also reduces the brightness of the image by a factor of 1.57. The above analysis assumes that the CRT phosphor response is linear, meaning that the phosphor brightness increases in direct proportion to the time the image is displayed. If, in fact, the phosphor response is non-linear, the brightness ratio could be greater than or less than the ratio described in the above analysis.

Moreover, because of the mirror's geometric optics, neither a triangle wave nor a sine wave results in a purely linear relationship between displacements of the mirror and positions of the perceived image along the viewing axis.

Hence, there is a need for a driving waveform which produces a bright image while operating quietly and without distortion. There is also a need for a driving waveform which produces a linear relationship between the displacement of the mirror and the position of the perceived image along the viewing axis.

Accordingly, it is a primary object of this invention to provide a method of displaying a three-dimensional image characterized by quiet operation without distortion while also yielding a bright image. It is also an object of this invention to provide a method which produces a nearly linear relationship between the displacement of the mirror and the position of the perceived image along the viewing axis.

SUMMARY OF THE INVENTION

To achieve the foregoing objects and in accordance with the purpose of the invention, as embodied and broadly described herein, there is disclosed an improved method for displaying a three-dimensional image in a system including a flexible membrane mirror, a cathode ray tube (CRT) screen, and a loudspeaker for driving the mirror and thereby moving an apparent image plane toward and away from a viewer, comprising the steps of:

(a) driving the mirror with a composite waveform h(t) having the following characteristics:

| | |
|---|---|
| $h(t) = A \cdot t$ | for $t = 0$ to $t^*$ |
| $h(t) = B \cdot \sin(w_B \cdot t) + X$ | for $t = t^*$ to $(T/2 - t^*)$ |
| $h(t) = (A \cdot T/2) - (A \cdot t)$ | for $t = (T/2 - t^*)$ to $(T/2 + t^*)$ |
| $h(t) = B \cdot \sin(w_B \cdot t) - X$ | for $t = (T/2 + t^*)$ to $(T - t^*)$ |
| $h(t) = (A \cdot t) - (A \cdot T)$ | for $t = (T - t^*)$ to $T$ | wherein "h(t)" is a displacement "h" of the mirror as a function of time, "A" is a slope, having a value greater than zero, of a triangle portion of the waveform h(t), "t" is time, "B" is an amplitude, having an absolute value greater than zero, of a sinusoidal portion of the waveform h(t), "$t^*$" is the time when the triangle portion and sinusoidal portion of the waveform h(t) have equal values and equal slopes, "$w_B$" is the frequency, having a value which is an odd harmonic of a fundamental frequency, of the sinusoidal portion of the waveform h(t), "X" is an offset of the sinusoidal portion of the waveform h(t), and "T" is a fundamental period of the waveform h(t); and (b) displaying a sequence of two-dimensional images synchronized to the displacement of the mirror so that a viewer perceives a three-dimensional image.

DETAILED DESCRIPTION OF THE PREFERRED EMBODIMENTS

Figure 1:
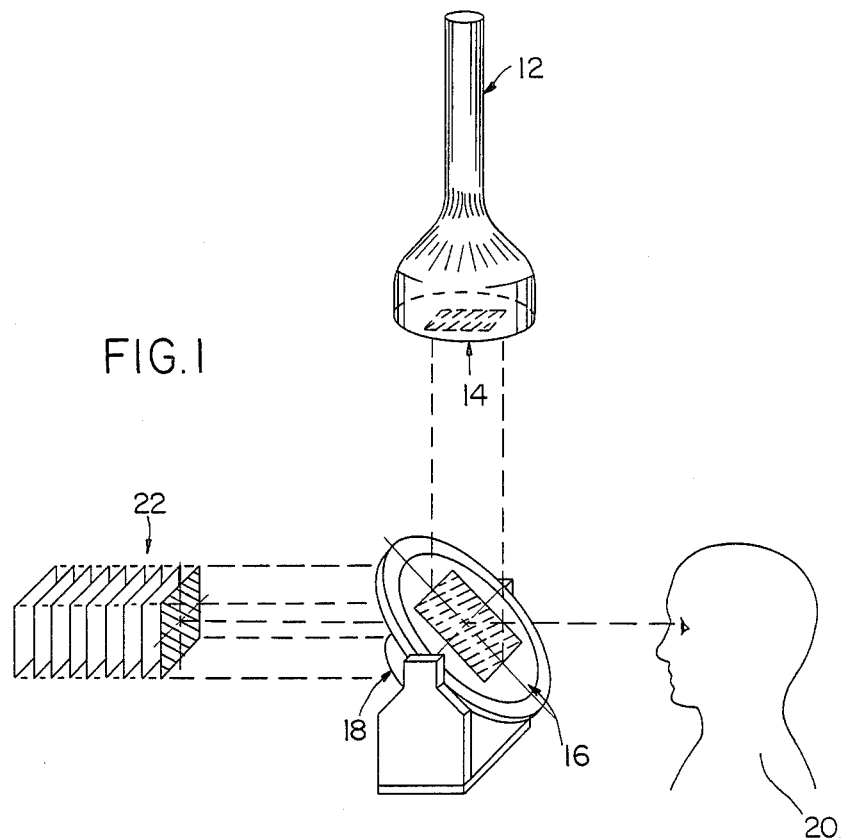
FIG. 1 is a pictorial representation of a three-dimensional image display system.

In FIG. 1 there is illustrated a display cathode ray tube (CRT) 12, which sequentially displays two-dimensional image 14 on a screen of CRT 12. That two-dimensional image 14 is reflected by flexible membrane mirror 16 having a natural frequency of about 200 hz. Mirror 16 is displaced (vibrated) into a shape that is alternately convex and concave by an action of loudspeaker 18 according to a given driving waveform (source not shown). When the vibration of mirror 16 is properly synchronized with the sequential display of images 14 on CRT 12, viewer 20 perceives virtual volume (or three-dimensional) image 22.

Figure 2:
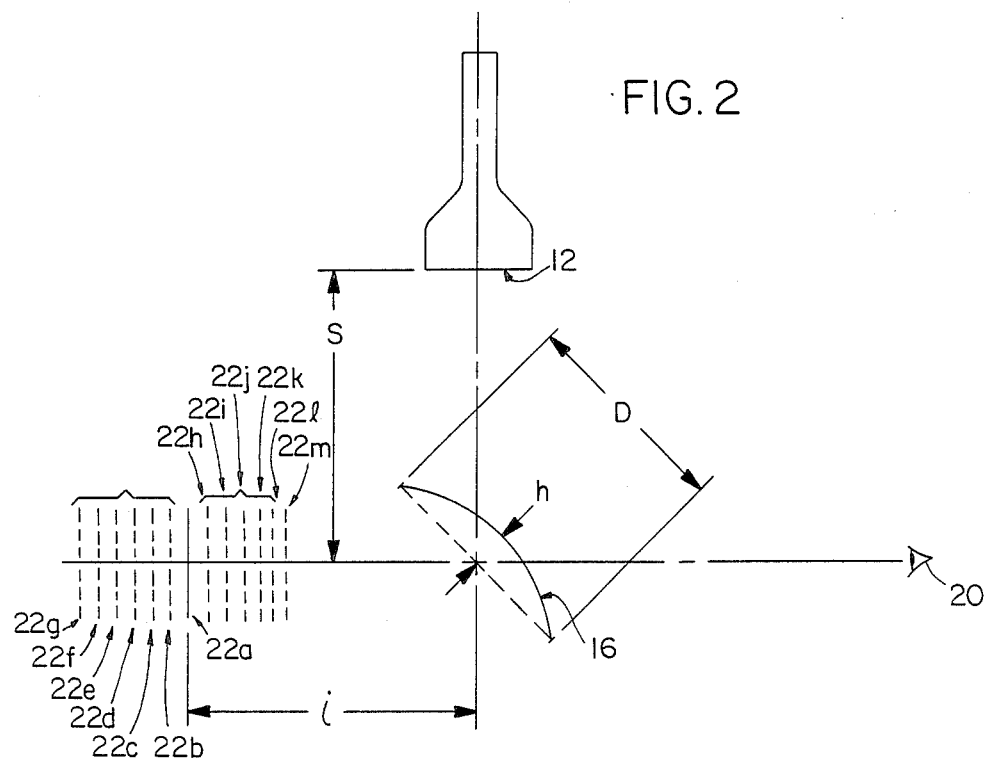
FIG. 2 is a pictorial representation of the geometric optics for the three-dimensional image display system of FIG. 1.

In FIG. 2 there is illustrated the CRT 12, the mirror 16, and the viewer 20 of FIG. 1, as well as representations of the mirror's diameter D, the mirror's displacement h, a distance i from the center of mirror 16 at rest to one image plane location 22a (with image plane locations 22b to 22m corresponding to other mirror positions), and a distance s from the screen of CRT 12 to the center of mirror 16 at rest.

One source of a driving waveform is an arrangement using computer technology familiar to those skilled in the art consisting of a computer having a memory loaded with stored numeric function values, a digital-to-analog converter which takes the stored numeric function values and converts them into an electrical voltage, an amplifier, and a clock for synchronizing the displayed two-dimensional images and the displacement of the mirror. As part of this arrangement, one could use an arbitrary waveform synthesizer commercially available from Hewlett Packard as HP Model 8770A. Since any complex waveform can be easily generated with this computer technology, both a composite driving waveform and a hybrid or linearized driving waveform of the present invention are practical to implement.

Figure 3:
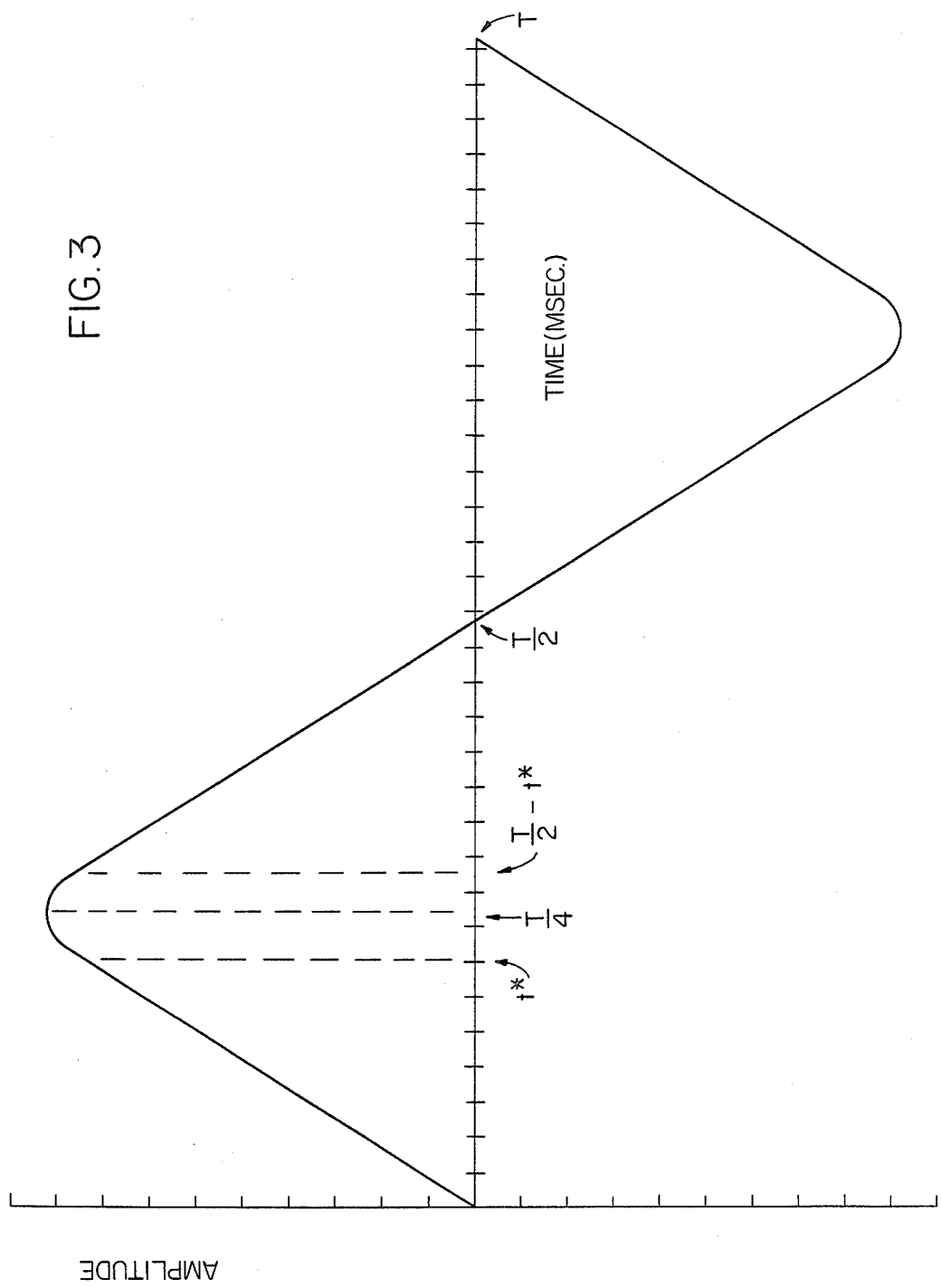
FIG. 3 is a graphic representation of a composite driving waveform according to one embodiment of the invention.

In FIG. 3 there is illustrated a graphical plot of a composite waveform to be used to drive a flexible membrane mirror according to a first embodiment of this invention. This waveform is a composite of a triangle wave portion and a sine wave portion. The sine wave portion can be regarded as rounding off or smoothing the corners of the triangle wave portion. A sine wave with a frequency that is an odd harmonic of a fundamental frequency can fit the triangle wave portion of the waveform with matching slopes. The third harmonic is regarded as the preferred selection because it generates the least noise, however, other odd harmonics can be used. The amount of rounding or smoothing can be varied by adjusting an amplitude of the third harmonic relative to the amplitude of the fundamental frequency. These two portions first join at a time designated $t^*$ where the respective slopes are equal and next join at a time designated $T/2-t^*$. This composite waveform accomplishes a primary object of this invention because using this waveform to drive a flexible mirror will provide quiet operation without distortion and it yields a bright image.

Mirror displacement "h" as a function of time is a displacement waveform h(t). This displacement waveform is the same as the voltage waveform which drives the loudspeaker (neglecting phase shifts and distortions). The plot in FIG. 3 represents the following composite waveform definition:

| | |
|---|---|
| $h(t) = A \cdot t$ | for $t = 0$ to $t^*$ |
| $h(t) = B \cdot \sin(w_B \cdot t) + X$ | for $t = t^*$ to $(T/2 - t^*)$ |
| $h(t) = (A \cdot T/2) - (A \cdot t)$ | for $t = (T/2 - t^*)$ to $(T/2 + t^*)$ |
| $h(t) = B \cdot \sin(w_B \cdot t) - X$ | for $t = (T/2 + t^*)$ to $(T - t^*)$ |
| $h(t) = (A \cdot t) - (A \cdot T)$ | for $t = (T - t^*)$ to $T$ | wherein:
t = time;
T = a fundamental period;
$w_B$ = the frequency, an odd harmonic of the fundamental frequency, of the sine wave portion of the waveform h(t);
$t^*$ = the time when the triangle portion and the sine wave portion of the waveform h(t) join, i.e., when they have equal slopes and equal values;
A = the slope, having a value greater than zero, of the triangle portion of the waveform h(t);

X = an offset of the sine wave portion of the waveform h(t); and

B = an amplitude, having absolute value greater than zero, of the sine wave portion of the waveform h(t).

The following equations are used to align the triangle portion and the sinusoidal portion of the waveform h(t) and to determine values for B and for X:

For symmetry, the rounding sine wave must be at a maximum at t=T/4.

$$\sin(w_B T/4) = \pm 1 \text{ where } W_B = 2N\pi/T \qquad (1)$$

$$\sin((2N\pi/T)(T/4)) = \pm 1$$

$$\sin(N\pi/2) = \pm 1$$

where N=1, 3, 5 ...

Any odd harmonics of the fundamental frequency can thus satisfy the symmetry condition.

The third harmonic is the lowest harmonic that satisfies the symmetry condition and thus generates the least noise. Thus, using N=3:

$$w_B = 2N\pi/T = 6\pi/T \qquad (2)$$

Point Matching: values of the triangle wave portion and the sine wave portion of waveform h(t) must be equal at t=t*.

$$A \cdot t^* = B \cdot \sin(w_B \cdot t^*) + X \qquad (3)$$

Slope Matching: Values of the slopes of the triangle wave and sine wave portions of waveform h(t) must be equal at t=t*.

$$\frac{d}{dt} A \cdot t^* = \frac{d}{dt} (B \cdot \sin(w_B \cdot t^*) + X) \qquad (4)$$

$$A = Bw_B \cos(w_B \cdot t^*)$$

Using the above equations it is possible to solve for values of X and B. Solving equation (4) for B:

$$B = A/(w_B \cos(w_B \cdot t^*)) \qquad (5)$$

Substituting equation 5 into equation 3:

$$A \cdot t^* = \frac{A \cdot \sin(w_B \cdot t^*)}{w_B \cos(w_B \cdot t^*)} + X \qquad (6)$$

Solving for X:

$$X = A \cdot t^* - A \cdot \tan(w_B t^*)/w_B \qquad (7)$$

Presented below is one example of how to determine values for B and for X, using hypothetical numerical values in the composite waveform definition.

Hypothetical Example

If it is assumed that the following is given:
T = 0.0333 seconds (30 hz. frequency);
$w_B$ = third harmonic = $2.3\pi/T = 6\pi/0.0333 = 565.5$ rad/sec.;
t* = 0.0333/4 − 0.0013 = 0.007 sec (about 1.3 msec before maximum value is reached at T/4); and
A = 100 mm/sec;
then equations (5) and (7) respectively can be solved for values of B and X.

Use equation 5 to find the value of B.
B = 100/(565.5 cos(565.5·0.007))
B = −0.258 mm Use equation 7 to find the value of X.
X = 100·0.007 − 100 tan(565.5·0.007)/565.5
X = +0.512 mm Substituting these values into the composite waveform definition given above yields the following example of a composite driving waveform according to one embodiment of the present invention:

| | |
|---|---|
| h(t) = 100 · t | for t = 0 to .007 |
| h(t) = −.258 · sin(565.5t) + .512 | for t = .007 to .00965 |
| h(t) = 100(.0333/2) − 100 · t | for t = .00965 to .02365 |
| h(t) = −.258 · sin(565.5t) − .512 | for t = .02365 to .0263 |
| h(t) = 100 · t − 100 · (.0333) | for t = .0263 to .0333 |

This example is plotted in FIG. 3.

Figure 4:
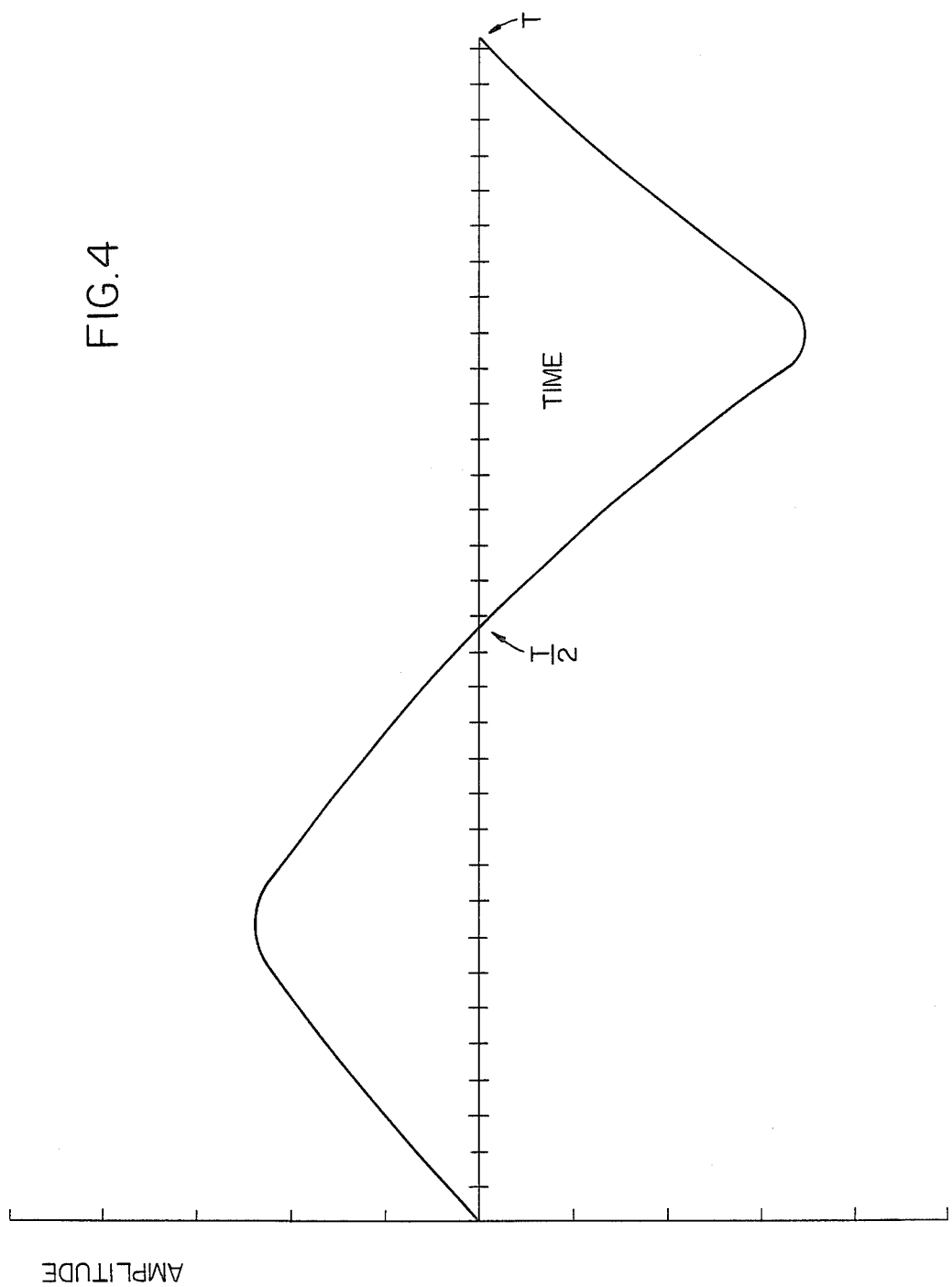
FIG. 4 is a graphic representation of a hybrid driving waveform according to another embodiment of the invention.

A graphical plot of another embodiment of the present invention, a hybrid waveform, is illustrated in FIG. 4. The horizontal axis indicates time and the vertical axis indicates amplitude of mirror displacement. To better understand this embodiment, consider the principles of optics for a three-dimensional display system such as that shown in FIG. 2. It can be assumed that the shape of mirror 16 is hemispherical when it is deformed by a pressure gradient produced by loudspeaker 18 (this is a very close approximation for the small mirror motion used with the present invention). A simple optics equation related to spherical mirrors is thus applicable:

$$1/s - 1/i = 1/f \qquad (8)$$

wherein "s" is the distance from the face of CRT 12 to mirror 16 and "i" is the distance from the center of mirror 16 at rest to image plane location 22a (because i=s when mirror 16 is at rest, one can regard "i" as having two components, "s" and "i'", so that i=s+i', wherein i' is a distance from image plane location 22a to another image plane location); "f" is the focal length of mirror 16 and is equal to:

$$f = D^2/16h' \qquad (9)$$

where "D" is a diameter of mirror 16 and "h'" is a displacement of the center of mirror 16 from a rest position. To determine image plane location as a function of time, substitute the values of i and f into mirror equation (8) and make h' and i' time dependent variables:

$$i'(t) = \frac{1}{(1/s) - (16h'(t)/D^2)} - s \qquad (10)$$

Inspection of equation (10) reveals that i'(t) is not linear with respect to h'(t). In terms of a relationship between image plane locations and time, an ideal driving waveform would provide image plane locations that are equally spaced from each other in time, that is, a driving waveform h'(t) which allows $$i'(t) = K \cdot t$$

where K is a constant. However, this would yield a driving waveform with a nearly triangular slope, and its attendant shortcomings of noise and distortion. The best method to overcome these shortcomings and still approximate a linearization between Δt (time between images) and Δi (distance along the viewing axis between images) is to have the image plane location move in accordance with the composite waveform definition. That is, solve equation (10) for h'(t) and substitute for i'(t) the composite driving waveform according to the first embodiment of the invention:

$$h'(t) = (D^2/16)[(1/s) - (1/(s + i'(t)))]$$

wherein i(t) has the following values

| | |
|---|---|
| i'(t) = A · t | for t = 0 to t* |
| i'(t) = B · sin($w_B$ · t) + X | for t = t* to (T/2 − t*) |
| i'(t) = (A · T/2) − (A · t) | for t = (T/2 − t*) to (T/2 + t*) |
| i'(t) = B · sin($w_B$ · t) − X | for t = (T/2 + t*) to (T − t*) |
| i'(t) = (A · t) − (A · T) | for t = (T − t*) to T |

FIG. 4 shows a plot of the resulting linearized or hybrid waveform h'(t) wherein D=30 cm, s=40 cm, and A=1000. Unlike the composite driving waveform of the first embodiment, this hybrid driving waveform has no straight line segments and is not symmetrical about the horizontal axis. Although not purely linear with respect to the relationship between "t" and i'(t), the advantage of this linearized or hybrid waveform h'(t) is that it can offer very substantial gains in image brightness for only modest increases in sound levels.

While particular embodiments of the present invention have been shown and described, it will of course be obvious to one skilled in the art that certain advantages and modifications may be effected without departing from the spirit of the invention, and it is intended that the scope of the invention be determined not by the foregoing illustrative examples of the invention but rather by the scope of the appended claims.

What I claim is:

1. A method for displaying a three-dimensional image in a system including a flexible membrane mirror, a cathode ray tube (CRT) screen, and a loudspeaker for driving the mirror and thereby moving an apparent image plane toward and away from a viewer, comprising the steps of:
   (a) driving the mirror with a composite waveform h(t) having the following characteristics:

| | |
|---|---|
| h(t) = A · t | for t = 0 to t* |
| h(t) = B · sin($w_B$ · t) + X | for t = t* to (T/2 − t*) |
| h(t) = (A · T/2) − (A · t) | for t = (T/2 − t*) to (T/2 + t*) |
| h(t) = B · sin($w_B$ · t) − X | for t = (T/2 + t*) to (T − t*) |
| h(t) = (A · t) − (A · T) | for t = (T − t*) to T | wherein "h(t)" is a displacement "h" of the mirror as a function of time, "A" is a slope, having a value greater than zero, of a triangle portion of the waveform h(t), "t" is time, "B" is an amplitude, having an absolute value greater than zero, of a sinusoidal portion of the waveform h(t), "t*" is the time when the triangle portion and sinusoidal portion of the waveform h(t) have equal values and equal slopes, "$w_B$" is a frequency, having a value which is an odd harmonic of a fundamental frequency, of the sinusoidal portion of the waveform h(t), "X" is an offset of the sinusoidal portion of the waveform h(t), and "T" is a fundamental period of the waveform h(t); and
   (b) displaying a sequence of two-dimensional images synchronized to the displacement of the mirror so that a viewer perceives a three-dimensional image.

2. A method for displaying a three-dimensional image in a system including a flexible membrane mirror, a cathode ray tube (CRT) screen, and a loudspeaker for driving the mirror and thereby moving an apparent image plane toward and away from a viewer, comprising the steps of:
   (a) driving the mirror with a hybrid waveform h'(t) having the following characteristics:

$$h'(t) = (D^2/16)[(1/s) - (1/(s + i'(t)))]$$

wherein "h'(t)" is a displacement "h'" of the mirror as a function of time, "D" is a diameter of the mirror, "s" is a distance between the mirror and the CRT screen, and "i'(t)" is a function of time having the following values:

| | |
|---|---|
| i'(t) = A · t | for t = 0 to t* |
| i'(t) = B · sin($w_B$ · t) + X | for t = t* to (T/2 − t*) |
| i'(t) = (A · T/2) − (A · t) | for t = (T/2 − t*) to (T/2 + t*) |
| i'(t) = B · sin($w_B$ · t) − X | for t = (T/2 + t*) to (T − t*) |
| i'(t) = (A · t) − (A · T) | for t = (T − t*) to T | wherein "A" is a slope, having a value greater than zero, of a triangle portion of the waveform h'(t), "t" is time, "B" is an amplitude, having an absolute value greater than zero, of a sinusoidal portion of the waveform h'(t), "t*" is the time when the triangle portion and sinusoidal portion of the waveform h(t) have equal values and equal slopes, "$w_B$" is a frequency, having a value which is an odd harmonic of a fundamental frequency, of the sinusoidal portion of the waveform h'(t), "X" is an offset of the sinusoidal portion of the waveform h'(t), and "T" is a fundamental period of the waveform h'(t); and
   (b) displaying a sequence of two-dimensional images synchronized to the displacement of the mirror so that a viewer perceives a three-dimensional image.

* * * * *